(12) United States Patent
Kuehner et al.

(10) Patent No.: US 12,407,142 B2
(45) Date of Patent: Sep. 2, 2025

(54) SYSTEMS AND METHODS FOR IMPROVING CONTACT CONDITION OF CHARGING CABLE AND PORT

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 17/724,402

(22) Filed: Apr. 19, 2022

(65) Prior Publication Data
US 2023/0335962 A1     Oct. 19, 2023

(51) Int. Cl.
*H01R 43/00*     (2006.01)
*B08B 7/02*      (2006.01)
*B60L 53/16*     (2019.01)
*B60L 53/18*     (2019.01)
(Continued)

(52) U.S. Cl.
CPC ............. *H01R 43/002* (2013.01); *B08B 7/02* (2013.01); *B60L 53/16* (2019.02); *B60L 53/18* (2019.02); *H01R 13/6683* (2013.01); *H01R 43/26* (2013.01); *H01R 2201/26* (2013.01)

(58) Field of Classification Search
CPC ........... B08B 7/02; B08B 7/026; B08B 7/028; B08B 2209/005; B60L 53/16; B60L 53/18; H01R 13/665; H01R 13/6683; H01R 2201/26; H01R 43/002; H01R 43/26
See application file for complete search history.

(56) References Cited

U.S. PATENT DOCUMENTS 9,911,292 B1 *  3/2018  Khoshkava ............. G08B 6/00
10,531,191 B2 * 1/2020  Macours ................. H04R 1/46
(Continued)

FOREIGN PATENT DOCUMENTS

CN     104971922     10/2015
CN     109703410      5/2019
(Continued)

*Primary Examiner* — Douglas Lee
(74) *Attorney, Agent, or Firm* — SHEPPARD, MULLIN, RICHTER & HAMPTON LLP; Daniel N. Yannuzzi

(57) ABSTRACT

Systems and methods are provided for improving a contact condition between a charging cable and a charging port. A charging cable may be plugged into a charging power to charge an electrical device. A charging cable may include a plug which may mate with prongs of a charging port. The plug may include sensors and a vibrator. The sensors may detect when a user intends to plug the charging cable into the charging port. Upon detection of intent to plug the charging cable into the charging port. The vibrator may be activated and may vibrate the plug. The vibration may generate relative movement between the prongs of the charging port and the plug. The movement may release dirt, dust, and corrosive materials from the charging port and plug, resulting in increased cleanliness. The movement may also assist in forming a more secure connection between the charging cable and plug.

20 Claims, 7 Drawing Sheets

(51) Int. Cl.
*H01R 13/66* (2006.01)
*H01R 43/26* (2006.01)

(56) References Cited

U.S. PATENT DOCUMENTS

| | | | | |
|---|---|---|---|---|
| 2011/0012717 A1* | 1/2011 | Pance | ................. | G06F 3/04886 |
| | | | | 340/407.2 |
| 2011/0227531 A1 | 9/2011 | Rajakaruna | | |
| 2015/0260639 A1 | 9/2015 | Thabeth | | |
| 2019/0324536 A1* | 10/2019 | Forest | .................... | G06F 3/016 |

FOREIGN PATENT DOCUMENTS

| | | |
|---|---|---|
| CN | 112389221 | 2/2021 |
| CN | 212447147 | 2/2021 |
| CN | 112517462 | 3/2021 |
| DE | 102016009095 | 2/2017 |
| DE | 102016009095 A1 * | 2/2017 |
| EP | 3466747 | 4/2019 |
| JP | 2017112805 A | 6/2017 |

* cited by examiner

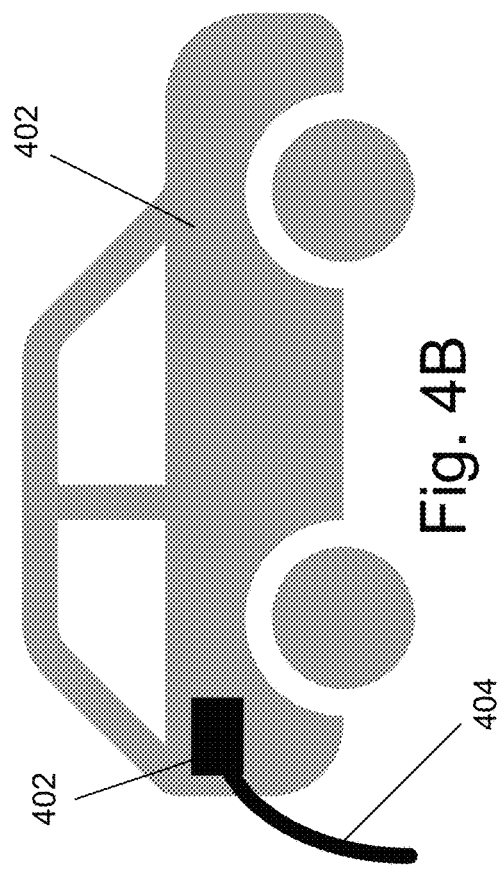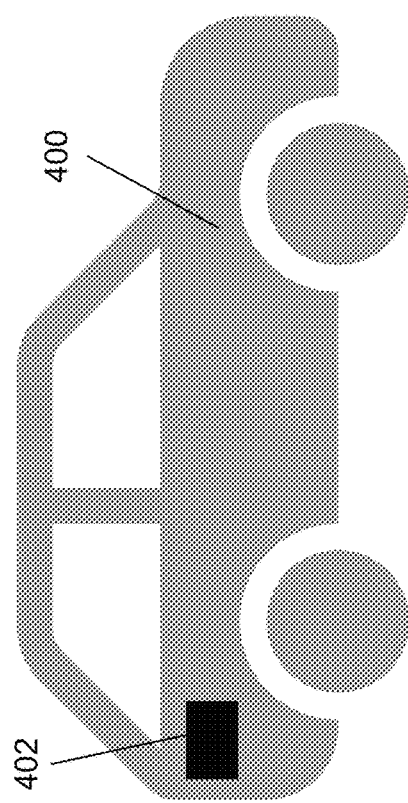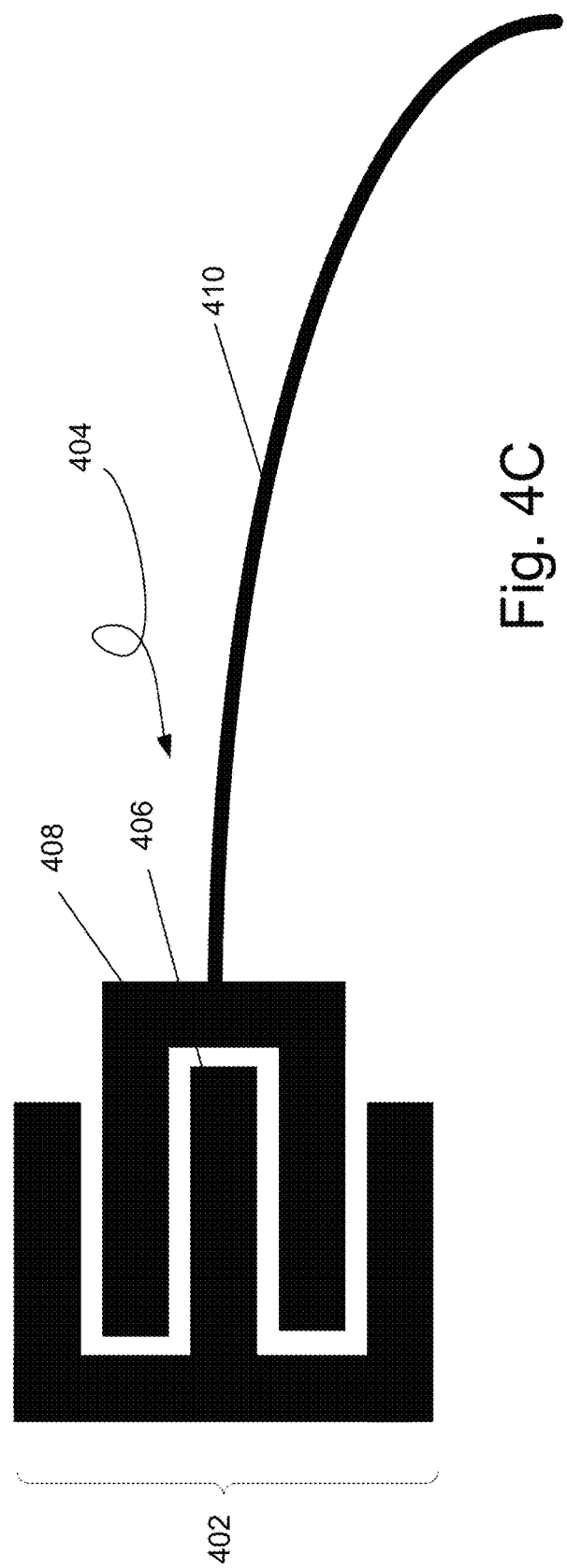

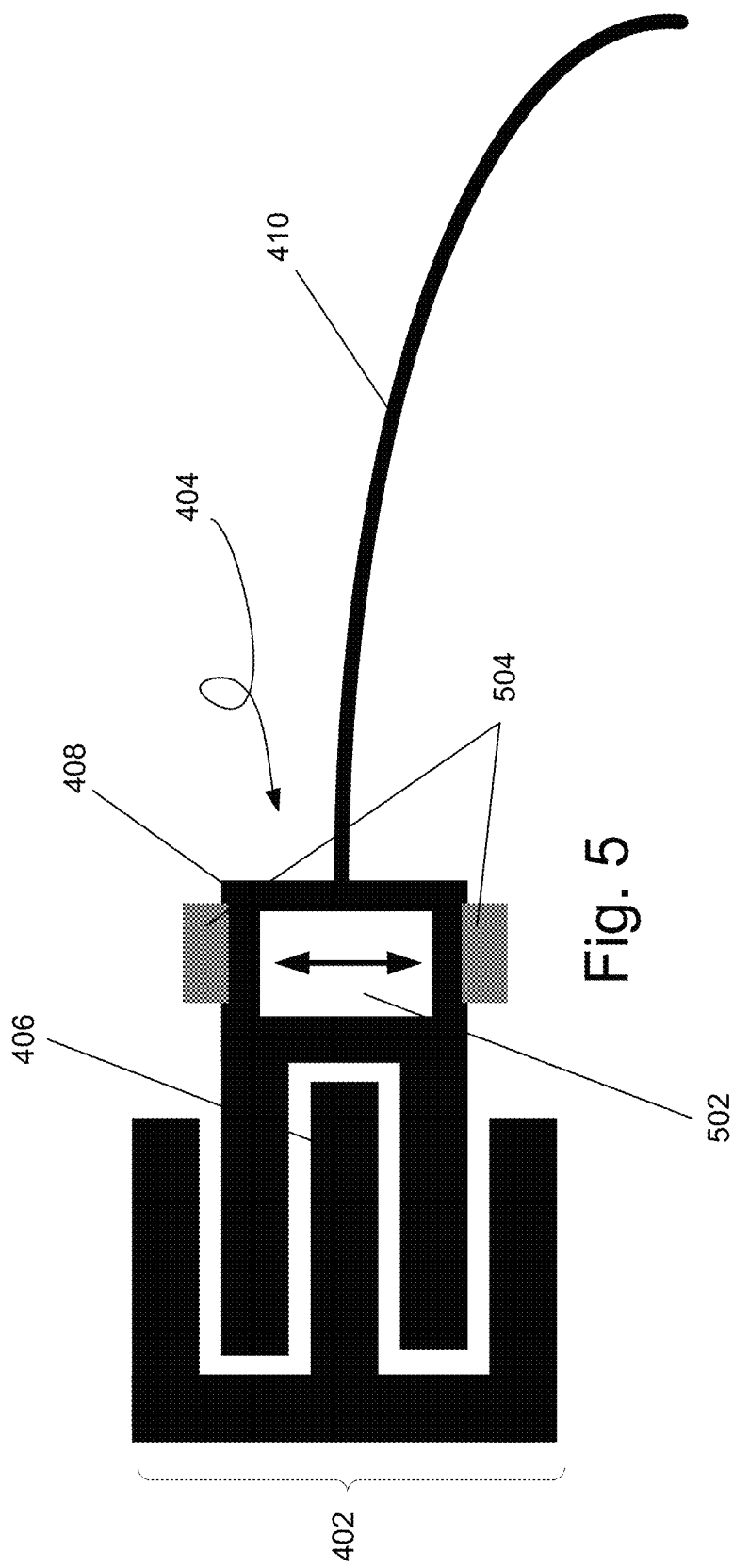

SYSTEMS AND METHODS FOR IMPROVING CONTACT CONDITION OF CHARGING CABLE AND PORT

TECHNICAL FIELD

The present disclosure relates generally to a charging arrangement including a port and charging cable, and in particular, some implementations may relate to improving a contact condition between a charging cable and a port configured to receive the charging cable.

DESCRIPTION OF RELATED ART

Rechargeable batteries power many types of devices including vehicles and other large devices. For example, electric vehicles ("EV") and hybrid electric vehicles ("HEV") may be powered by rechargeable batteries. Rechargeable batteries are important today as they provide an alternative powering source to fossil fuels. Rechargeable batteries store energy, e.g., chemical energy that can be converted to electrical energy and later released to power a device but must be recharged occasionally when the power reserve is depleted. Many devices contain fixed rechargeable batteries. In other words, the batteries cannot be readily taken out of the device and must be charged while they are still in the device. Typically, to recharge a fixed rechargeable battery, a charging cable connected to a power source must be attached to a port located in or on the device. Electricity from the power source then flows through the charging cable and eventually to the port, which will be utilized to recharge the batteries.

Over time and/or with increasing use, the quality of the port and/or charging cable may degrade. The degradation may effect charging quality and efficiency. For example, the charging port and/or the portion of the charging cable that connects to the charging port could become corroded or dirty. Additionally, the integrity of the connection between the port and the cable could become warped. Corrosion, dirt, warping, and other conditions affecting charging quality and efficient may occur due to plugging and/or unplugging the charging cable from the port many times. As the contact condition between the charging cable and the port degrades, the amount of electricity flowing from the charging cable and into the port may be reduced. Given the reduced amount of electricity, it make take a longer period of time to recharge the rechargeable battery. The rechargeable battery also many not be able to be fully charged, resulting in the need for more frequent charging. Depending on the type of battery, frequent charging can ultimately harm the battery's life. If extreme degradation occurs, charging may be completely prevented. In high power systems, such as EVs or HEVs, even a small reduction in charging capability may result in a high energy loss.

BRIEF SUMMARY OF THE DISCLOSURE

According to various embodiments of the disclosed technology a contact condition improvement system may include contact sensors and an electromechanical vibrator. The contact sensors may be configured to detect when a plug of a charging cable contacts a charging port. The electromechanical vibrator may be attached to the plug of the charging cable and configured to vibrate the plug of the charging cable when the contact sensor determines the plug of the charging cable contacts the charging port. The vibrating of the plug of the charging cable may generate relative movement between the contact surfaces of the plug of the charging cable and prongs of the charging port based on transferred vibration from the electromechanical vibrator to the charging port via contact with the plug.

In an embodiment of a contact condition improvement system, the electromechanical vibrator may be configured to deliver vibrations at a frequency such that at least one of dirt, dust, and corrosive material is released from the charging port and the plug of the charging cable. In an embodiment of a contact condition improvement system, the electromechanical vibrator may be configured to deliver vibrations at a frequency set to assist a user in plugging the charging cable into the charging port.

In an embodiment of a contact condition improvement system, the electromechanical vibrator may be configured to deliver vibrations at a frequency below about 1000 Hz. In an embodiment of a contact condition improvement system, the electromechanical vibrator may be configured to deliver vibrations at a frequency ranging from about 200 Hz to about 400 Hz. In an embodiment of a contact condition improvement system, the electromechanical vibrator may be configured to deliver vibrations at a frequency of about 200 Hz. In an embodiment of a contact condition improvement system, the electromechanical vibrator may be configured to deliver vibrations at a frequency ranging from about 10 Hz to about 40 Hz.

In an embodiment of a contact condition improvement system, the contact sensors may be configured to detect an attempt to plug the charging cable into the charging port based on detecting that a current has started to flow from the charging cable to the charging port.

In an embodiment of a contact condition improvement system, the electromechanical vibrator may be configured to deliver vibrations at a selected frequency, the selected frequency based on the type of dirt, dust, or corrosive material present on the charging port and plug. In an embodiment of a contact condition improvement system, the electromechanical vibrator may be configured to deliver vibrations at a selected frequency, the selected frequency based on a mechanical coupling configuration of the charging port and plug.

A contact condition improvement method may include detecting an attempt to plug a plug of a charging cable into a charging port. A contact condition improvement method may also include vibrating the plug of the charging cable as the plug of the charging cable is plugged into the charging port upon detection of an attempt to plug the plug of the charging cable into the charging port. The vibration may be configured to overcome resistance between contact surfaces of the plug of the charging cable and prongs of the charging port to establish an improved contact condition.

In an embodiment of a contact condition improvement method, the frequency of the vibration delivered may vary as a function of time for a time period beginning when a user attempts to plug the plug of the charging cable into the charging port and ending when the user attempts to remove the plug of the charging cable from the charging port. In an embodiment of a contact condition improvement method, the frequency of the vibration delivered may vary as a function of the depth of penetration of the plug of the charging cable into the charging port.

A contact condition maintenance method may include detecting contact between a plug of a charging cable and a charging port. A contact condition maintenance method may also include cleaning contact surfaces of the plug of the charging cable by vibrating the plug of the charging cable. The vibration may be configured to loosen materials present on the contact surfaces of the plug. A contact condition maintenance method may also include cleaning prongs of the charging port by vibrating the plug of the charging cable. The vibration of the plug may be transferred from the plug to the charging port via contact between the plug and the charging port. The vibration may be configured to loosen materials present on the prongs of the charging port.

In an embodiment, a contact condition maintenance method may also include continuing to vibrate the plug of the charging cable while the plug of the charging cable remains plugged into the charging port. In an embodiment, a contact condition maintenance method may also include preemptively vibrating the plug of the charging cable before detecting contact between the plug of the charging cable and the charging port.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4A shows an example of an electric vehicle having a charging port.

FIG. 4B shows an example of an electric vehicle have a charging port with a cable plugged into the charging port to charge the vehicle.

FIG. 4C shows a close up example of a charging port receiving a charging cable.

FIG. 5 shows an example of a charging cable configured with a vibrator and contact sensors.

The figures are not exhaustive and do not limit the present disclosure to the precise form disclosed.

DETAILED DESCRIPTION

Embodiments of the systems and methods disclosed herein can provide an improved contact condition between a charging cable and a port configured to receive the charging cable. Specifically, the system and methods disclosed herein may improve or maintain a contact condition between a charging cable and a port configured to receive the charging cable by vibrating a plug of the charging cable as the charging cable is inserted into the port. The vibrations may clean or maintain cleanliness of the contact areas between the port and the plug of the charging cable.

The systems and methods disclosed herein may be particularly helpful in maintaining or improving a contact condition between a charging cable and a port in high power systems. High power systems may be, for example, systems generating hundreds of kilowatts of energy. In such a system, charging efficiency may be compromised due to accumulation of dust, dirt, corrosion, or other materials on the contacts of the charging cable and/or of the port. Additionally, over time, a connection between a charging cable and a port can become less secure, for example, due to warping of contacts or other charging components. In such a system, even a 1% loss of charging efficiency may be a significant energy loss, given the overall high power nature of the system. Therefore, improving and maintaining the contact condition between the charging cable and the port may achieve significant energy savings. High power systems may include vehicles such as EVs and HEVs. High power systems may also include boats, aircraft, high power machinery, mobile homes and/or homes and any other high power system generating at about 100 kilowatts or above.

Figure 1:
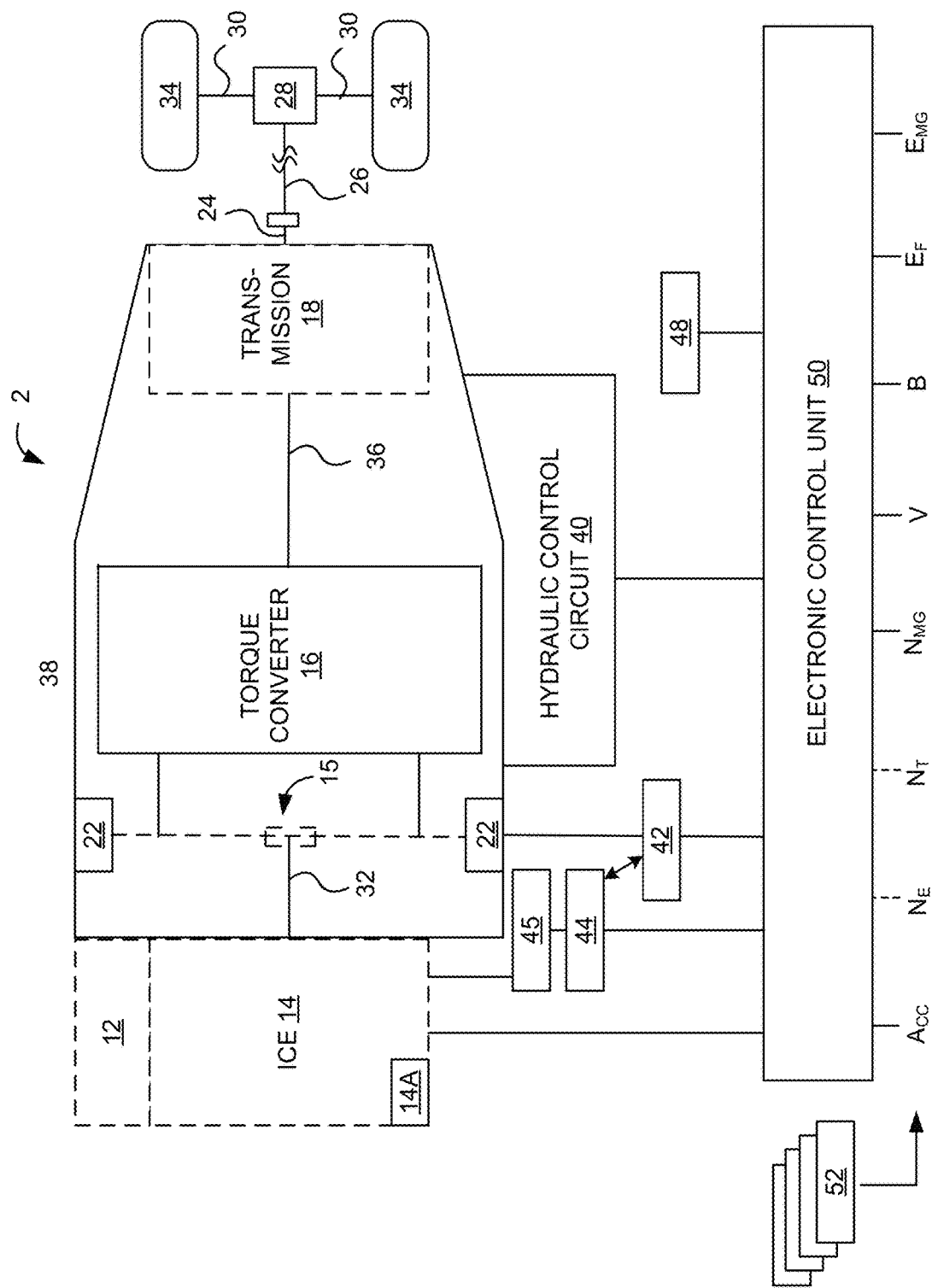
FIG. 1 is a schematic representation of an example hybrid vehicle with which embodiments of the systems and methods disclosed herein may be implemented.

In addition to other high power systems, the systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods can be implemented in other types of vehicle including electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator. Battery 44 may also be charged by an external source. Battery 44 may be charged via a charging port. An external charging capable, drawing power from an external charging source, may be connected to the charging port to charge the battery 44.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc. Sensors 52 may also include contact sensors configured to detect attempted charging of a vehicle using a charging cable. Contact sensors may be configured on a vehicle charging port and/or on a vehicle charging cable.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
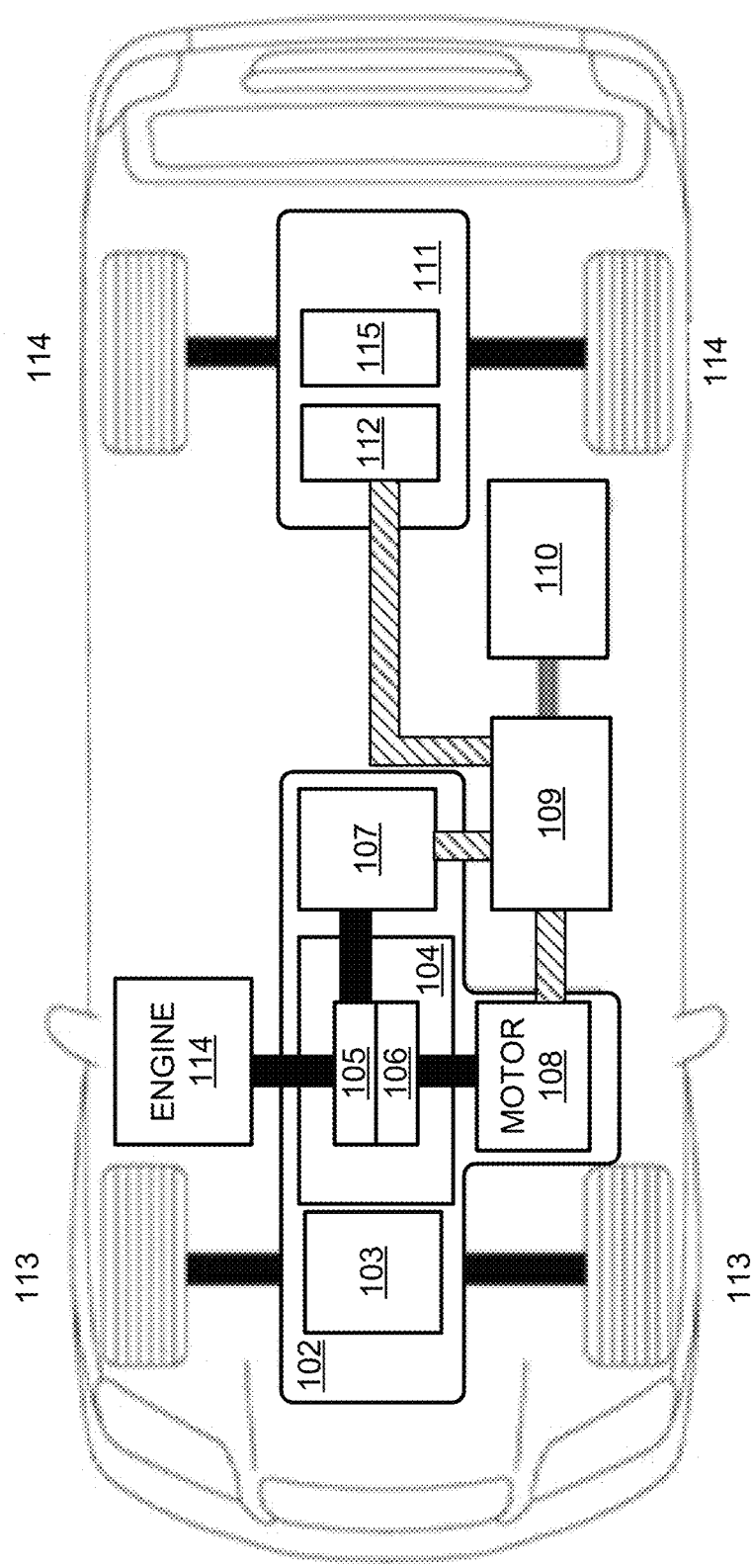
FIG. 2 illustrates an example of an all-wheel drive hybrid vehicle with which embodiments of the systems and methods disclosed herein may be implemented.

FIG. 2 is another example of a vehicle with which systems and methods for improving contact condition of a charging cable and port may be implemented. The example illustrated in FIG. 2 is also that of a hybrid vehicle drive system of a vehicle 110 that may also include an engine 114 (e.g., engine 14) and one or more electric motors 108, 112 (e.g., motors 22) as sources of motive power. In this example, a hybrid transaxle 102 includes front differential 103, a compound gear unit 104, a motor 108, and a generator 107. Compound gear unit 104 includes a power split planetary gear unit 105 and a motor speed reduction planetary gear unit 106. This example vehicle also includes front and rear drive motors 108, 112, an inverter with converter assembly 109, batteries 110, and a rear differential 115. Hybrid transaxle assembly 102 enables power from engine 101, motor 108, or both to be applied to front wheels 113 via front differential 103.

Inverter with converter assembly 109 inverts DC power from batteries 110 to create AC power to drive AC motors 108, 112. In embodiments where motors 108, 112 are DC motors, no inverter is required. Inverter with converter assembly 109 also accepts power from generator 107 (e.g., during engine charging) and uses this power to charge batteries 110.

The examples of FIGS. 1 and 2 are provided for illustration purposes only as examples of vehicle systems with which embodiments of the disclosed technology may be implemented. One of ordinary skill in the art reading this description will understand how the disclosed embodiments can be implemented with vehicle platforms.

Figure 3:
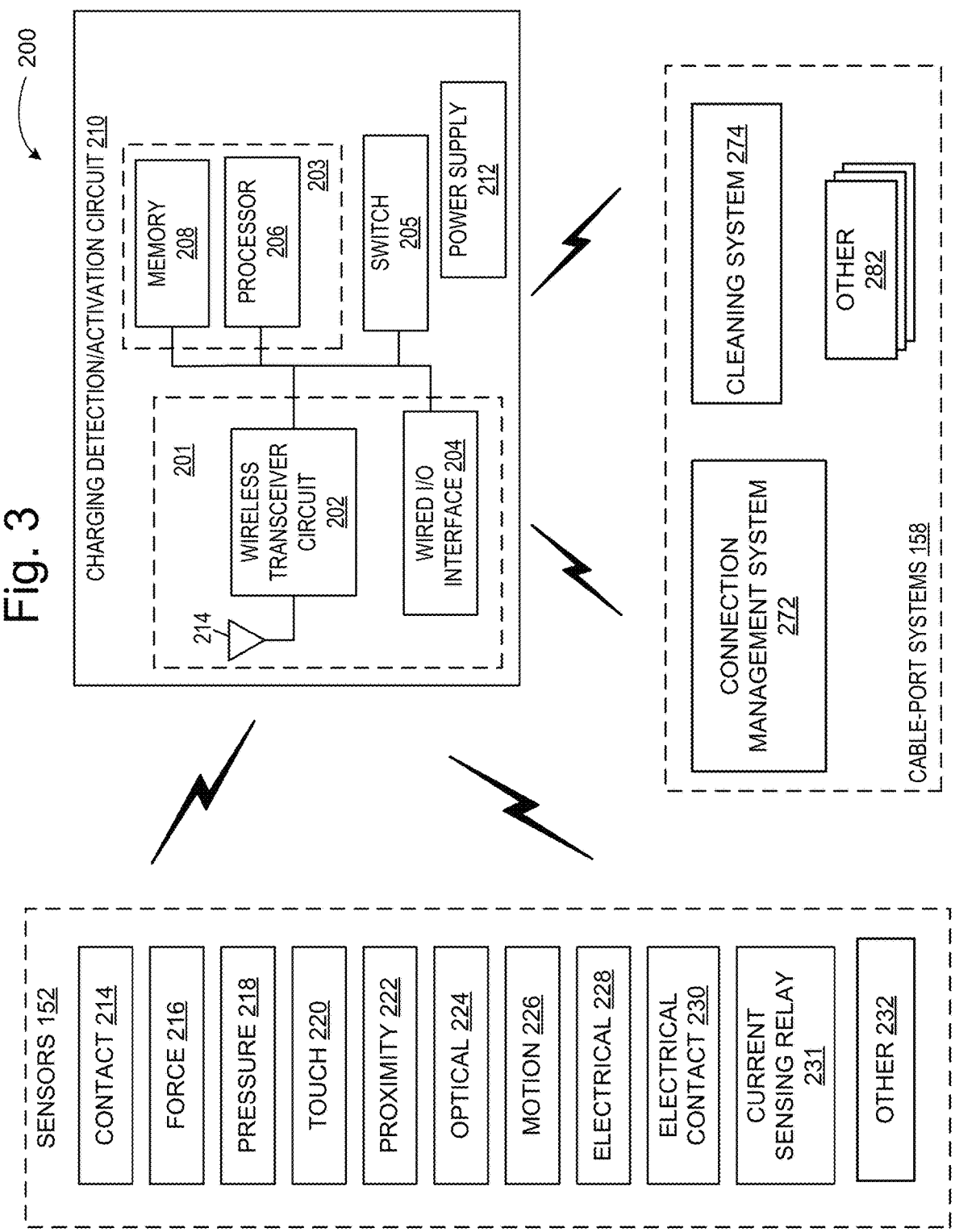
FIG. 3 illustrates an example architecture for detecting attempted charging and activating a vibration mode in accordance with one embodiment of the systems and methods described herein.

FIG. 3 illustrates an example architecture for detecting an attempt to connect a charging cable and activating a vibration mode in accordance with one embodiment of the systems and methods described herein. Referring now to FIG. 3, in this example, charging detection and vibration activation system 200 includes an charging detection/activation circuit 210, a plurality of sensors 152, and a plurality of cable-port systems 158. Sensors 152 and cable-port systems 158 can communicate with charging detection/activation circuit 210 via a wired or wireless communication interface. Although sensors 152 and cable-port systems 158 are depicted as communicating with charging detection/activation circuit 210, they can also communicate with each other as well as with other cable-port systems.

Charging detection/activation circuit 210 in this example includes a communication circuit 201, a decision circuit (including a processor 206 and memory 208 in this example) and a power supply 212. Components of charging detection/activation circuit 210 are illustrated as communicating with each other via a data bus, although other communication in interfaces can be included. Charging detection/activation circuit 210 in this example also includes a manual switch 205 that can be operated by the user to manually select the vibration mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to implement charging detection/activation circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a charging detection/activation circuit 210.

Communication circuit 201 either or both a wireless transceiver circuit 202 with an associated antenna 214 and a wired I/O interface 204 with an associated hardwired data port (not illustrated). As this example illustrates, communications with charging detection/activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by charging detection/activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or not otherwise be included on a standard vehicle 10 with which the charging detection and vibration activation system 200 is implemented. In the illustrated example, sensors 152 include contact sensors 214, force sensors 216, pressure sensors 218, touch sensors 220, proximity sensors 222, optical sensors 224, motion sensors 226, electrical sensors 228, electrical contact sensors 230, and a current sensing relay 231. Additional sensors 232 can also be included as may be appropriate for a given implementation of charging system 200.

Cable-port systems 158 can include any of a number of different components or subsystems used to control or monitor various aspects of the cable-port and its performance. In this example, the cable-port systems 158 include a connection management system 272 to maintain the integrity of the connection between the port and charging cable, cleaning system 274 to free the charging port and/or charging cable from accumulated dust, dirty, corrosion, and other substances, and other cable-port systems 282 as may be appropriate.

During operation, charging detection/activation circuit 210 can receive information from various sensors to determine whether the vibration mode should be activated. Also, the operator may manually activate the vibration mode by operating switch 205. Communication circuit 201 can be used to transmit and receive information between charging detection/activation circuit 210 and sensors 152, and charging detection/activation circuit 210 and cable-port systems 158. Also, sensors 152 may communicate with cable-port systems 158 directly or indirectly (e.g., via communication circuit 201 or otherwise).

In various embodiments, communication circuit 201 can be configured to receive data and other information from sensors 152 that is used in determining whether to activate the vibration mode. Additionally, communication circuit 201 can be used to send an activation signal or other activation information to various cable-port systems 158 as part of entering the vibration mode. For example, as described in more detail below, communication circuit 201 can be used to send signals to, for example, one or more of: connection management system 272 to control vibration of the charging cable to improve connection quality; cleaning system 274 to control vibration of the charging cable to release dust, dirt, corrosion, and other materials from the charging port and/or charging cable; and other systems 282 as may be appropriate. Specifically, vibration of a plug of the charging cable may generate relative movement between the surfaces of the plug and prongs of the charging port as the plug is plugged into the charging port or while the plug is plugged into the charging port. Initially, there may be resistance, such as frictional resistance, preventing the plug from being fully inserted into the charging port. The vibration may assist in overcoming this resistance. Similarly, the friction between surfaces generated by the vibration may assist in release dust, dirt, and/or corrosion from those surfaces. The decision regarding what action to take via these various cable-port systems 158 can be made based on the information detected by sensors 152. Examples of this are described in more detail below.

FIGS. 4A, 4B, and 4C are diagrams showing an example of the systems and methods disclosed herein configured to charge an electric vehicle. Specifically. FIGS. 4A, 4B, and 4C, taken together, show an example of a vehicle that includes a port capable of receiving a charging cable having a plug. Though FIGS. 4A, 4B, and 4C show an example system implement in a vehicle, it should be understood that the systems and methods disclosed herein may be implemented in any device powered by rechargeable electric batteries. The embodiments disclosed herein are not intended to be limited to electric or plug-in hybrid electric vehicles and need not be so limited. Persons having skill in the art will understand how the systems disclosed herein may be implemented in other electrical devices.

FIG. 4A shows an example of a vehicle 400. The vehicle 400 may be an electric vehicle. The vehicle may also be a plug-in hybrid electric vehicle. The vehicle 400 may be equipped with a charging port 402. The vehicle 400 may store energy. The stored power may power some or all vehicle functions for the vehicle 400. To recharge its power reserves, the vehicle 400 may receive external power through the charging port 402. FIG. 4B shows an example of a vehicle 400 receiving power through its charging port 402. The vehicle 400 may receive external power through a charger 404. The charger 404 may be plugged in to the vehicle 400. The charger 404 may be configured to be plugged in to the charging port 402 of the vehicle 400 to recharge the vehicle's power reserves.

FIG. 4C shows a close up example of a charger 404 plugged in to a charging port 402. A charging port 402 may include prongs. As shown in FIG. 4C, a charging port 402 may include one prong 406. A charging port 402 may also include more than one prong in a an embodiment. A charger 400 may include a plug 408. A charger may also include a cable 410. The plug 408 may be connected to the cable 410. The cable 410 may draw power from an external source. The power may then be transferred from the external source to the vehicle 400 when the plug 408 contacts the charging port 402. The plug 408 may be configured to mate with the charging port 402. Mating the plug 408 and the charging port 402 may generate contact (e.g., frictional) resistance between the prong 406 of the charging port and the plug 408.

In an embodiment, the prong 406 may be made of a highly conductive material. For example, the prong 406 may be made out of copper. The prong 406 may also be made out of other appropriate conductive materials. In an embodiment, the prong may include multiple prongs. In an embodiment, the prong may comprise a prong assembly that includes multiple conductive contact points.

As explained in more detail below, with reference to FIGS. 5 and 6, the systems and methods herein may improve and/or maintain a contact condition between the plug 408 of the charger 404 and the charging port 402 by vibrating the plug 408 of the charger 404 as the charger 404 is inserted into the port 402. Generating vibrations increases relative movement between the prong 406 and the plug 408. The relative movement may increase friction. The relative movement and/or increased friction and vibration between the plug 408 and the charging port 402 may clean and/or maintain the cleanliness of the contact portion of the charging port 402. The relative movement and/or increased friction and vibration may also achieve a more secure connection between the charging port 402 and the plug 408. For example, frictional resistance may be present as a plug of the charging cable is inserted into a charging port. This frictional resistance may prevent the plug from being fully inserted into the charging port. Vibrating the plug of the charging cable during insertion may assist in overcoming the frictional resistance which may enable a user to more fully insert the plug into the charging port.

FIG. 5 shows an example of a charging cable configured with a vibrator and contact sensors. As shown in FIG. 5 and discussed above, a charging port 402 may include a prong 406. A charger 404 may include a cable 410. The cable 410 may be connected to a plug 408. The plug 408 may be configured to mate with the charging port 402. The plug 408, as shown in FIG. 5, may further include a vibrator 502 and sensors 504.

The vibrator 502 may be an electromechanical vibrator. The vibration supplied by the vibrator 502 may be of a sufficient frequency to generate relative movement and/or friction between contact surfaces of a plug attached to a charging cable and contact surfaces of prongs of a charging port. When the contact surfaces of the plug rub against the contact surfaces of the prongs due to the vibration, dust, dirt, corrosion, and other materials may be loosened and released from the contact surfaces. The generated relative movement and/or friction may also assist in establishing a secure connection between the charging cable and the port. However, the frequency of the vibration may not be so great that the vibration overpowers a user as the user plugs the charging cable into a port. The vibration frequency may also not be so great that the vibration compromises the connection between the charging cable and the port. In an example, embodiment, the vibration frequency may be below about 1000 Hz. In another example embodiment, the vibration frequency may range from about 200 Hz to about 400 Hz. In an example embodiment, the vibration frequency may be about 200 Hz. In an example embodiment, the vibration frequency may range from about 10 Hz to about 40 Hz.

Vibration frequency may vary depending on the type of buildup present on the charging port and/or plug. For example, different types of dirt, dust, and/or corrosive materials may release more or less effectively at different frequency levels. For instance, therefore, frequency may be set depending on the type of dust, dirt, or corrosive material present. Alternatively, sensors may be configured to detect they type of dust, dirt, or corrosive material present and the system may calibrate the frequency accordingly.

As shown in FIG. 5, the plug 408 may also include sensors 504. The plug 408 may include one sensor or more than one sensors. In the example shown in FIG. 5, the plug 408 includes two sensors 504. Sensors may be any type of sensor configured to detect when a person is handling the charger. For example, sensors may be contact sensors, force sensors, pressure sensors, touch sensors, proximity sensors, optical sensors, motion sensors, and other types of sensors. The sensors may also be any type of sensor configured to determine when charge has begun to flow from the plug into the charging port. For example sensors may include electrical sensors, electrical contact sensors, a current sensing relay, and other types of sensors.

The vibrator and/or sensors may need power to operate. In an embodiment, the vibrator and/or sensors may be powered by existing energy in the charging cable. In an embodiment, the vibrator and/or sensors may be powered externally. For example, the plug may, when not plugged into a charging port, be connected to a dock or some other power source. The plug may then store amounts of power sufficient to power the vibrator and/or sensors when the plug is plugged into the charging cable instead of the dock. The charging cable may also be configured with its own, integrated power source.

In an embodiment, the vibration may clean the charging port and/or the plug of the charging cable. The vibration may generate relative movement and/or friction between the contact portions of the charging port and plug. For example, the vibration may generate relative movement and/or friction between the prong of the charging port and the plug, configured to mate with the prong. The relative movement and/or friction may release dust, dirt, corrosion, and other materials. In an embodiment, different frictional forces may be applied based on the desired cleaning function. For example, a user may which to perform a deep cleaning function. Vibration may be applied at a higher frequency to release dirt, dust, corrosion, and other materials that have built up on the prong and/or plug over time. A lot of dirt, dust, and/or corrosion may be have accumulated and may have been pressed into the prong and/or plug with repeated charging. Therefore, a stronger frictional force may be needed to release the built up material.

In another embodiment, a user may desire a proactive cleaning function. For example, a user may which to clean the charging port and plug every time the user chargers the vehicle or other electrical device. Vibration may be applied at a slightly lower frequency, compared to the above embodiment regarding deep cleaning. Higher frequency vibration may not be needed because dirt, dust, corrosion, and other materials may not have been built up on the prong and/or plug. Rather a small amount of loose dust or dirt may be present, which may be easy to remove with comparatively low level vibration. The cleanliness of the contact condition between the charging port and the plug may be maintained by repeated, proactive cleanings. In an embodiment, the vibration may continue while a car is charging to ensure cleanliness. Ensuring the charging port and plug are clean may reduce the risk of lost energy due to decreased contact. Lost energy may result in increased charging times or the need for more frequency charging. In severe situations, the charging port and/or plugs may be so dirty or corroded that the vehicle or electrical device is not charging at all. In a high energy system, reduction of even a small amount of lost energy, such as 1%, may result in significant energy savings.

In another embodiment, the vibration supplied may assist in establishing a more secure connection between the charging port and the plug. The vibration may also assist a user in securely plugging the plug into the charging port. The vibration may generate relative movement and/or friction between the prong and plug which may enable the prong and plug to be more securely connected, reducing the risk that the plug may slip out of the charging port. Additionally, a user may find it difficult to firmly and fully plug the plug into the charging port. A user may find it difficult to fully plug the plug into the charging port due to initial resistance. Vibrating the plug may assist in overcoming the initial frictional resistance and may assist the user in more fully plugging the plug into the charging port. Additionally, vibrating the plug may assist the plug in settling fully into the charging port and maintaining a secure connection with the charging port, despite initial frictional resistance. In an embodiment, the vibration may continue while the vehicle or other electrical device is charging to ensure that the connection between the charging port and the plug remains secure. Ensuring the plug is plugged securely and fully into the charging port reduces the risk of lost energy due to a poor connection. Lost energy may result in increased charging times or the need for more frequency charging. In severe situations, a poor connection may result in the vehicle or electrical device not charging at all. In a high energy system, reduction of even a small amount of lost energy, such as 1%, may result in significant energy savings.

Figure 6:
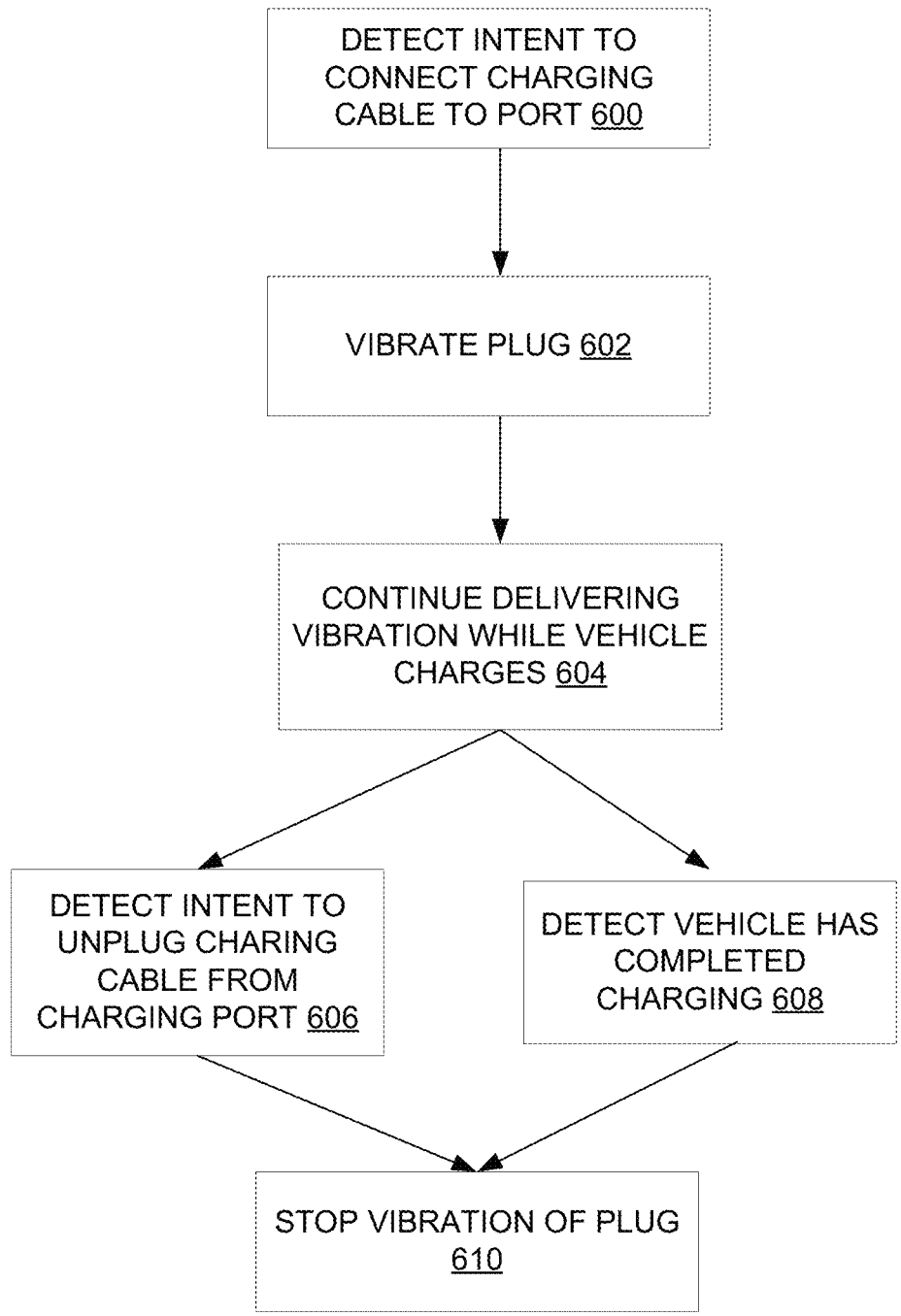
FIG. 6 is a flow diagram showing an example of a method for improving the contact condition between a charging cable and a charging port.

FIG. 6 is a flow diagram showing an example of a method for maintaining and/or cleaning a contact condition between a charging port and a plug. As shown in FIG. 6, a plug may be inserted into a charging port. The plug may include a vibrator which may cause the plug to vibrate as the plug is inserted into the charging port. The plug may also include sensors, such as contract sensors, which may detect when a user is handling the plug of the charging cable. The vibration may begin when the sensors detect that a user is handling the plug.

As shown in FIG. 6, a method for maintain and/or cleaning a contact condition may include, as a first operation 600, detecting a user intent to connect a charging cable to a charging port. Intent to connect may be accomplished using sensors 152, as shown in FIG. 3 and describe with reference to FIG. 3. Sensors may include contact sensors, force sensors, pressure sensors, touch sensors, proximity sensors, optical sensors, motion sensors, electrical sensors, electrical contact sensors, a current sensing relay, and other types of appropriate sensors. Sensors may be configured to detect that a user is handling, touching, lifting, and/or moving the charging cable. Sensors may also be configured to detect that a user is moving the charging cable toward the charging port. Sensors may also be configured to detect that a user has successfully maneuvered the charging cable into contact with the charging port. Sensors also may be configured to detect that a current is beginning to flow between the charging cable and the charging port. In an embodiment, the sensors may detect that a user has initiated the plugging in process or intends to plug the charging cabled into the charging port. At the time of detection, the charging cable may not be fully and securely plugged into the charging port.

As shown in FIG. 3 and discussed with reference to FIG. 3, the sensors 152 may be communicable coupled to an charging detection/activation circuit 210 and to cable-port systems 158. The cable port systems may include a connection management system 272 and cleaning system 274. Each of these systems may use a vibrator to accomplish their respective connection management and cleaning functions.

Referring back to FIG. 6, as a second operation 602, the method may include vibrating the plug. Sensors may detect an intent to connect the charging cable to the charging port, as discussed above. The charging detection/activation circuit 210 may receive an indication from the sensors of the intent to connect the charging cable to the charging port. The charging detection/activation circuit 210 may then communicate the intent indication to the cable-port systems 158 to initiate connection management and or cleaning functions. These functions may be accomplished by vibrating the plug. In an embodiment, the plug may begin to vibrate as soon as a user handles the charging cable. In an embodiment, the plug may begin to vibrate when a user raises the charging cable and places the charging cable in proximity to the charging port. In an embodiment, the vibration may begin when a user initiates plugging the charging cable into the charging port. In an embodiment, the vibration may begin when current begins to flow from the charging cable into the charging port.

Referring to FIG. 6, as a third operation 604, vibration may continue while the vehicle or other electrical device charges. The vibration may be used to clean and/or maintain the cleanliness of the contact area between the prong of the charging port and the plug of the charging cable, as discussed above. As a fourth operation 606, the sensors may detect that a user has unplugged or intends to unplug the charging cable from the charging port. As an alternative fourth operation 608, the sensors may detect that the vehicle or electrical device has finished charging. As a fifth operation 610, the plug may stop vibrating.

In an alternative embodiment, vibration may continue throughout the unplugging process. The vibration may assist the user in releasing the charging cable from the charging port. In another embodiment, vibration may begin while the charging cable is unplugged and before a user begins plugging the charging cable into the charging port. For example, vibration may be activated proactively. A user may turn on the vibration feature automatically. Alternatively, the vibration feature may turn on automatically at predetermined times. Alternatively, the vibration feature may turn on automatically based on sensor information, such as sensor information indicating a user is handling the charging cable.

In an embodiment, the frequency of the vibrations delivered may change throughout the plugging in and/or charging process. For example, frequency may be comparatively low when a user begins to plug the charging cable into the charging port, allowing for a looser fit. Then, as the charging cable is plugged into the charging port, the frequency may increase resulting in a stiffer configuration. In another embodiment, the frequency may vary depending on the mechanical coupling arrangement between the charging port and the charging cable. For example, different frequencies may be appropriate for different configurations. In one example configuration, a charging port may include one prong. In another example, a charging port may include more than one prong. In another example, a charging port may include a prong assembly that includes multiple conductive contact points. The frequency delivered may depend on the configuration of the charging port.

In another embodiment, the frequency delivered may be a function of time. For example, vibration may begin at a relatively low frequency while the user plugs the charging cable into the charging port. Vibration may gradually increase as the vehicle charges. Vibration may reach a peak vibration. Vibration may then gradually decrease as the vehicle continues to charge. Vibration may then decrease to a comparatively low level as the user unplugs the charging cable from the charging port. In another embodiment, the frequency delivered may be a function of penetration. For example, vibration may begin at a relatively low frequency while the user plugs the charging cable into the charging port and the charging cable plug has not fully penetrated the charging port. Vibration may gradually increase as the charging cable is plugged more fully into the charging port. Vibration may reach a peak vibration when the charging cable is fully plugged into the charging port. Vibration may then decrease to as the user unplugs the charging cable from the charging port. The converse arrangement may also be possible. For example, vibration may begin high as a user plugs the cable into the port to assist the user in plugging in the cable. Vibration may then decrease while the cable is fully plugged in and rise again as the user unplugs the cable. Vibration may also vary as a function of other factors.

Figure 7:
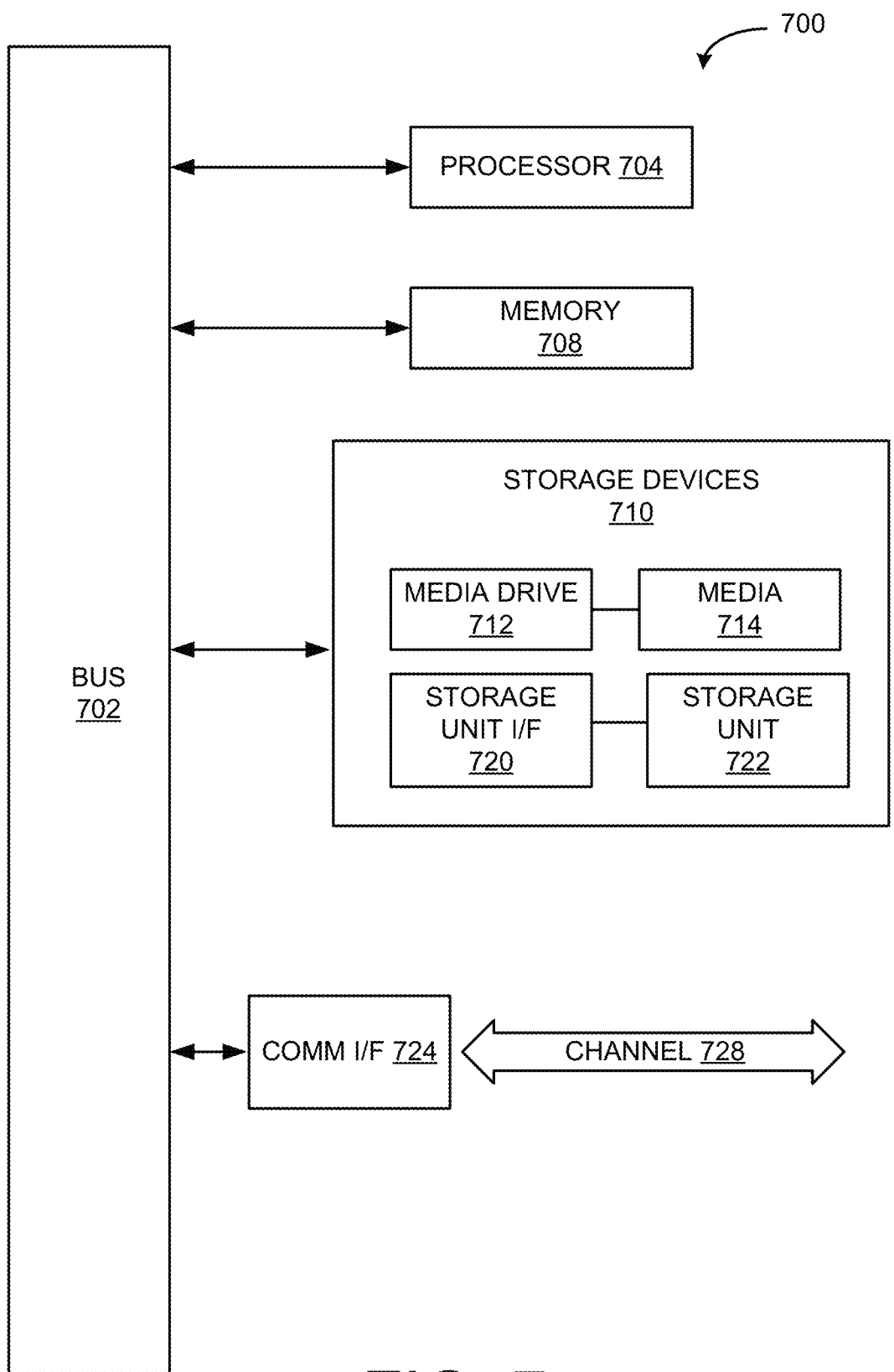
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up user device, user system, and non-decrypting cloud service. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The terms "substantially," "approximately," and "about" are used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed is:

1. A contact condition improvement system comprising:
   a contact sensor configured to detect when a plug of a charging cable contacts a charging port; and
   an electromechanical vibrator attached to the plug of the charging cable and configured to vibrate the plug of the charging cable within a determined vibration frequency range when the contact sensor determines the plug of the charging cable contacts the charging port,
   wherein vibrating the plug of the charging cable within the determined vibration frequency range generates sufficient relative movement and friction between contact surfaces of the plug of the charging cable and prongs of the charging port based on transferred vibration from the electromechanical vibrator to the charging port via contact with the plug to release unwanted foreign materials from the contact surfaces without breaking contact between the plug of the charging cable and the charging port, and
   wherein the electromechanical vibrator is configured to deliver vibrations at a frequency within the determined vibration frequency range that varies as a function of a depth of penetration of the plug of the charging cable into the charging port.

2. The system of claim 1, wherein the electromechanical vibrator is configured to deliver vibrations at a frequency within the determined vibration frequency range such that at least one of dirt, dust, and corrosive material is released from the charging port and the plug of the charging cable.

3. The system of claim 1, wherein the electromechanical vibrator is configured to deliver vibrations at a frequency set to assist a user in plugging the charging cable into the charging port.

4. The system of claim 1, wherein the electromechanical vibrator is configured to deliver vibrations at a frequency within the determined vibration frequency range below 1000 Hz.

5. The system of claim 4, wherein the electromechanical vibrator is configured to deliver vibrations at the determined vibration frequency of 1000 Hz.

6. The system of claim 1, wherein the electromechanical vibrator is configured to deliver vibrations at the determined vibration frequency range from 400 Hz to 1000 Hz.

7. The system of claim 5, wherein the electromechanical vibrator is configured to deliver vibrations at a frequency of 400 Hz.

8. The system of claim 1, wherein the contact is configured to detect an attempt to plug the charging cable into the charging port based on detecting that a current has started to flow from the charging cable to the charging port.

9. The system of claim 1, wherein the electromechanical vibrator is configured to deliver vibrations at a selected frequency within the determined vibration frequency range, the selected frequency based on the type of dirt, dust, or corrosive material present on the charging port and plug.

10. The system of claim 1, wherein the electromechanical vibrator is configured to deliver vibrations at a selected frequency within the determined vibration frequency range, the selected frequency based on a mechanical coupling configuration of the charging port and plug.

11. A contact condition improvement method comprising:
    detecting when a plug of a charging cable contacts a charging port; and
    vibrating the plug of the charging cable within a determined vibration frequency range when the plug of the charging cable contacts the charging port, wherein the vibrating the plug of the charging cable within the determined vibration frequency range generates sufficient relative movement and friction between contact surfaces of the plug of the charging cable and prongs of the charging port based on transferred vibration to the charging port via contact with the plug to release unwanted foreign materials from the contact surfaces without breaking contact between the plug of the charging cable and the charging port, and wherein the vibrating the plug of the charging cable is configured to deliver vibrations at a frequency within the determined vibration frequency range that varies as a function of a depth of penetration of the plug of the charging cable into the charging port.

12. The method of claim 11, wherein the vibrating the plug of the charging cable is configured to deliver vibrations at a frequency within the determined vibration frequency range such that at least one of dirt, dust, and corrosive material is released from the charging port and the plug of the charging cable.

13. The method of claim 11, wherein the vibrating the plug of the charging cable is configured to deliver vibrations at a frequency set to assist a user in plugging the charging cable into the charging port.

14. The method of claim 11, wherein the vibrating the plug of the charging cable is configured to deliver vibrations at a frequency within the determined vibration frequency range below 1000 Hz.

15. The method of claim 14, wherein the vibrating the plug of the charging cable is configured to deliver vibrations at the determined vibration frequency of 1000 Hz.

16. The method of claim 15, wherein the vibrating the plug of the charging cable is configured to deliver vibrations at the determined vibration frequency range from 400 Hz to 1000 Hz.

17. The method of claim 15, wherein the vibrating the plug of the charging cable is configured to deliver vibrations at a frequency of 400 Hz.

18. The method of claim 11, wherein the contact is configured to detect an attempt to plug the charging cable into the charging port based on detecting that a current has started to flow from the charging cable to the charging port.

19. The method of claim 11, wherein the vibrating the plug of the charging cable is configured to deliver vibrations at a selected frequency within the determined vibration frequency range, the selected frequency based on the type of dirt, dust, or corrosive material present on the charging port and plug.

20. The method of claim 11, wherein the vibrating the plug of the charging cable is configured to deliver vibrations at a selected frequency within the determined vibration frequency range, the selected frequency based on a mechanical coupling configuration of the charging port and plug.

* * * * *